(12) United States Patent
Koshitouge et al.

(10) Patent No.: US 10,174,905 B2
(45) Date of Patent: Jan. 8, 2019

(54) OPTICAL FILM PRODUCTION METHOD, OPTICAL FILM, SURFACE LIGHT-EMITTING BODY AND OPTICAL FILM PRODUCTION DEVICE

(71) Applicant: Mitsubishi Rayon Co., Ltd., Tokyo (JP)

(72) Inventors: Haruki Koshitouge, Yokohama (JP); Daichi Okuno, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 256 days.

(21) Appl. No.: 14/779,619

(22) PCT Filed: Feb. 27, 2014

(86) PCT No.: PCT/JP2014/054804
§ 371 (c)(1),
(2) Date: Sep. 24, 2015

(87) PCT Pub. No.: WO2014/156452
PCT Pub. Date: Oct. 2, 2014

(65) Prior Publication Data
US 2016/0061407 A1     Mar. 3, 2016

(30) Foreign Application Priority Data
Mar. 28, 2013  (JP) ................. 2013-068515

(51) Int. Cl.
*B29D 11/00* (2006.01)
*B29C 41/26* (2006.01)
(Continued)

(52) U.S. Cl.
CPC .............. *F21V 5/004* (2013.01); *B29C 41/26* (2013.01); *B29C 41/28* (2013.01);
(Continued)

(58) Field of Classification Search
None
See application file for complete search history.

(56) References Cited

U.S. PATENT DOCUMENTS

2004/0219302 A1* 11/2004 Krause ............. B29D 11/00288
427/496
2006/0220271 A1* 10/2006 Jackson ............. A44B 18/0049
264/166
(Continued)

FOREIGN PATENT DOCUMENTS

| JP | 07-32476 A | 2/1995 |
| JP | 11-156869 A | 6/1999 |

(Continued)

OTHER PUBLICATIONS

International Search Report issued in corresponding International Patent Application No. PCT/JP2014/054804 dated May 27, 2014.
Extended European Search Report issued in European Patent Application No. 14776045.8 dated Oct. 13, 2016.

*Primary Examiner* — Lisa L Herring
(74) *Attorney, Agent, or Firm* — Morgan, Lewis & Bockius LLP

(57) ABSTRACT

An optical film production method for suppressing air bubbles in microlenses, comprising rotating a roll die having a plurality of concave-shaped microlens transfer portions on the surface and running a substrate in the rotation direction; supplying an active energy ray-curable composition β onto a coating roll adjacent to the roll die surface, flattening the composition β, coating the flattened composition β on the roll die surface; supplying an active energy ray-curable composition α on the substrate and coating the composition α on a surface of the substrate; associating the compositions α and β between the roll die and the substrate to form a liquid pool; and irradiating a region between the roll die surface and the substrate surface with an active energy ray (Continued)

so the compositions α and β are sandwiched between the roll die surface and the substrate surface to cure the compositions α and β.

13 Claims, 5 Drawing Sheets

(51) Int. Cl.
- *F21V 5/00* (2018.01)
- *G02B 3/00* (2006.01)
- *B29C 41/28* (2006.01)
- *B29K 105/00* (2006.01)

(52) U.S. Cl.
CPC .. *B29D 11/00288* (2013.01); *B29D 11/00365* (2013.01); *B29D 11/00788* (2013.01); *G02B 3/0031* (2013.01); *B29D 11/00298* (2013.01); *B29K 2105/0002* (2013.01); *B29K 2105/0094* (2013.01); *G02B 3/0043* (2013.01); *G02B 3/0056* (2013.01)

(56) References Cited

U.S. PATENT DOCUMENTS

| | | | |
|---|---|---|---|
| 2008/0088052 A1* | 4/2008 | Takada | B29C 43/021 264/145 |
| 2012/0321793 A1 | 12/2012 | Lundvall et al. | |
| 2015/0360453 A1* | 12/2015 | Lundvall | B41M 1/10 156/240 |

FOREIGN PATENT DOCUMENTS

| | | |
|---|---|---|
| JP | 2001-062853 A | 3/2001 |
| JP | 2003-305736 A | 10/2003 |
| JP | 2004-249655 A | 9/2004 |
| JP | 2006-315347 A | 11/2006 |
| JP | 2007-168094 A | 7/2007 |
| JP | 2008-058494 A | 3/2008 |
| WO | 98/23978 A | 6/1998 |
| WO | 2006/041089 A1 | 4/2006 |
| WO | 2012/166447 A2 | 12/2012 |

* cited by examiner

[Fig. 1]
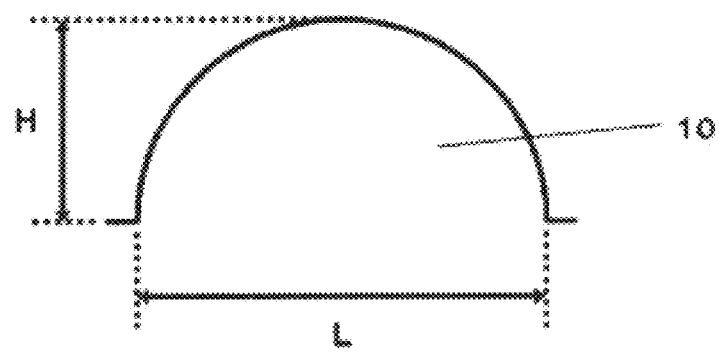
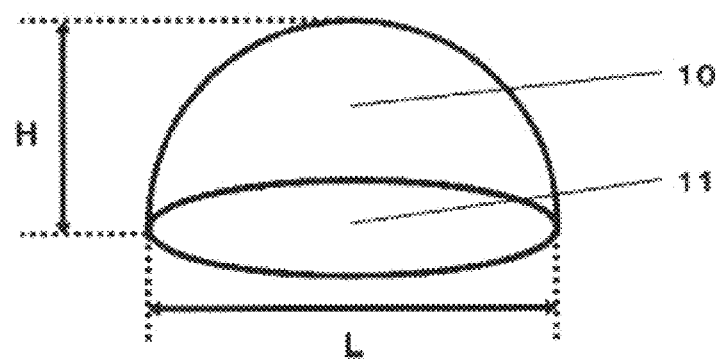
[Fig. 2]
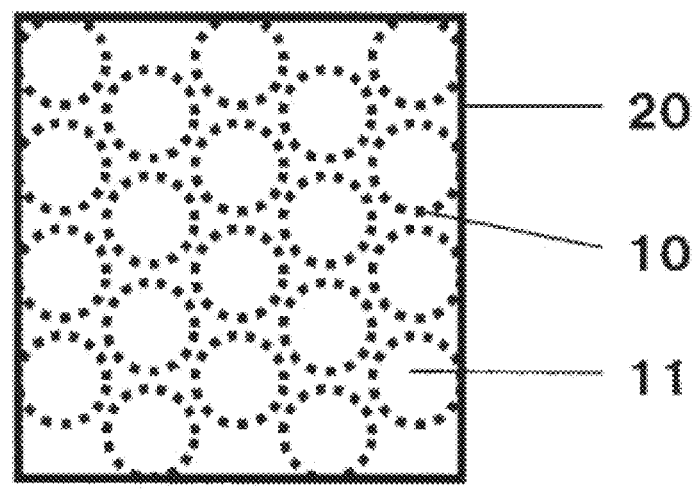

[Fig. 3]
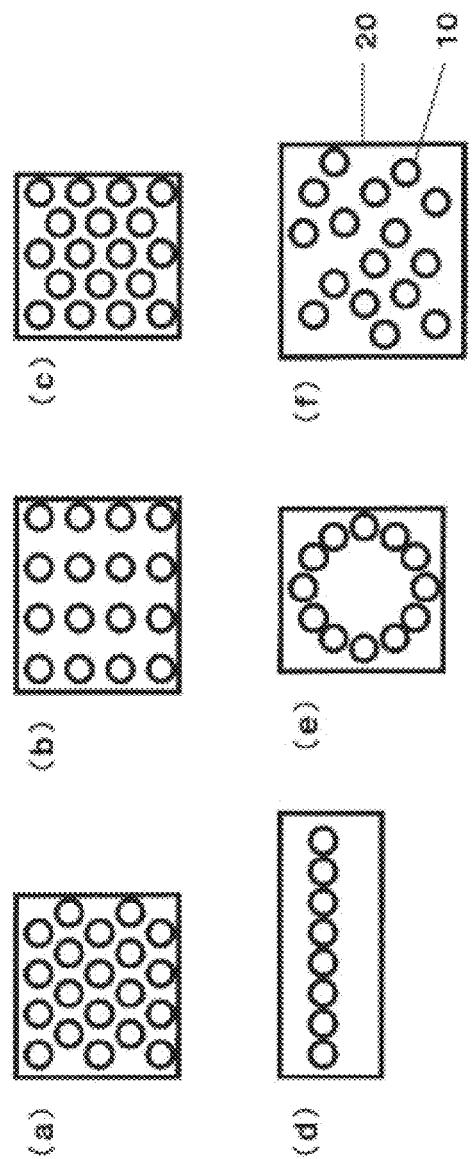

[Fig. 4]
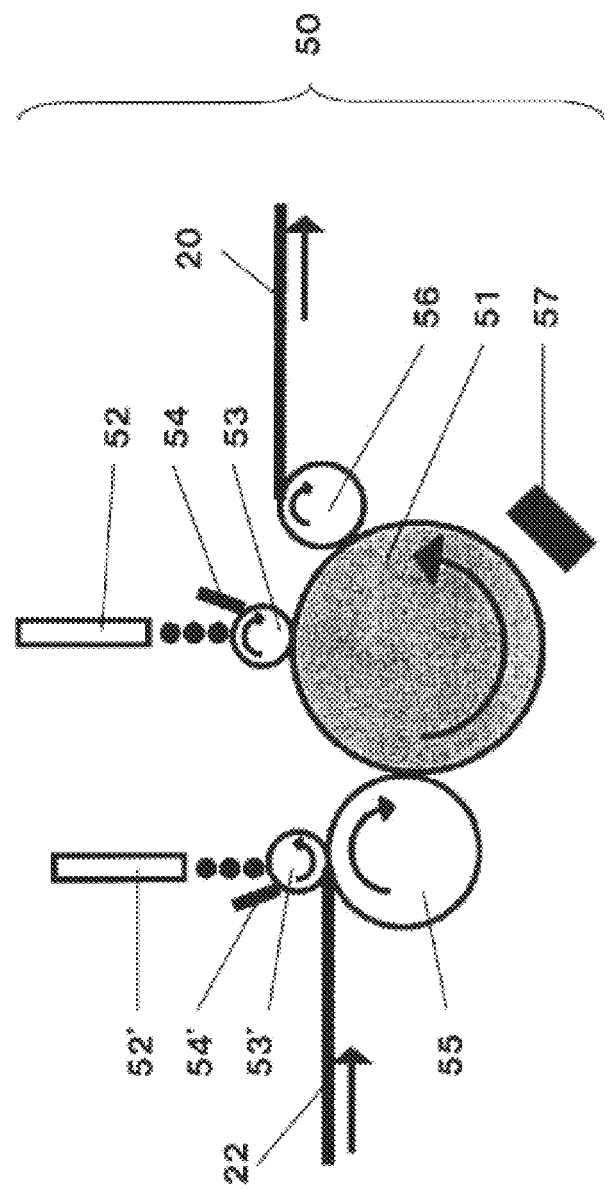

[Fig. 5]
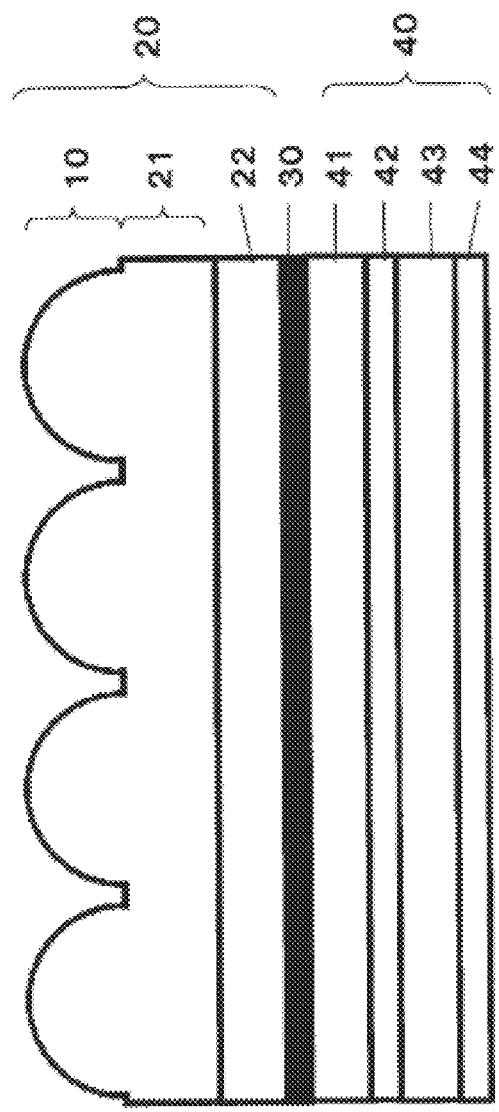

[Fig. 6]
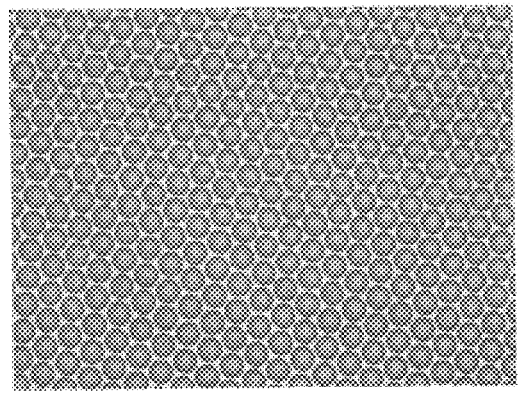
[Fig. 7]
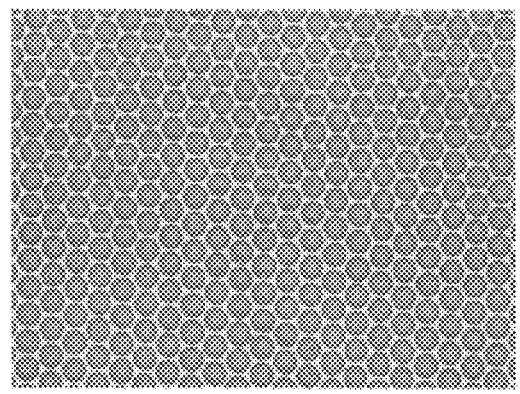
[Fig. 8]
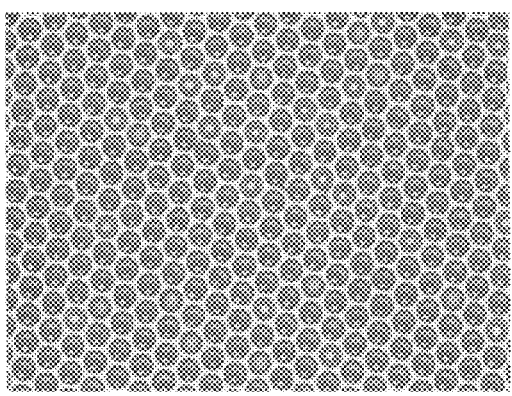

OPTICAL FILM PRODUCTION METHOD, OPTICAL FILM, SURFACE LIGHT-EMITTING BODY AND OPTICAL FILM PRODUCTION DEVICE

TECHNICAL FIELD

The present invention relates to an optical film production method having plural convex-shaped microlenses disposed thereon, an optical films obtained by this production method, a surface light-emitting body including this optical film, and an optical film production device having plural convex-shaped microlenses disposed thereon.

BACKGROUND ART

An organic EL (electroluminescence) light-emitting device is expected to be used in next-generation lighting as an alternative of a flat panel display, a fluorescent lamp, or the like.

In general, the organic EL light-emitting device is a stacked body of thin films, and the angle of total reflection of light between the thin films is determined by the difference in refractive index between the materials of the respective thin films. At present, approximately 80% of the light generated in the light-emitting layer is confined to the inside of the organic EL light-emitting device and it is not possible to extract the light to the outside. Specifically, the critical angle, $\theta_c$, is 41.8° when the refractive index of a glass substrate is 1.5 and the refractive index of an air layer is 1.0, and the light with an angle of incidence smaller than this critical angle, $\theta_c$, exits from the glass substrate to the air layer but the light with an angle of incidence greater than this critical angle, $\theta_c$, is totally reflected to be confined to the inside of the glass substrate. Hence, it is desired to extract the light confined to the inside of the glass substrate on the surface of the organic EL light-emitting device to the outside of the glass substrate, namely, to improve the light extraction efficiency.

As a method for improving the light extraction efficiency of the organic EL light-emitting device, it is known to provide an optical film in which a plurality of microlenses are disposed on the light-exiting surface of the organic EL light-emitting device. As a method for producing such an optical film, a method in which an active energy ray-curable composition is directly dropped on a roll die, coated on the entire roll die, and cured is proposed in Patent Document 1 and Patent Document 2.

CITATION LIST

Patent Document

Patent Document 1: WO 98/23978 A
Patent Document 2: JP 2008-58494 A

SUMMARY OF THE INVENTION

Problem to be Solved by the Invention

In the optical film production method proposed in Patent Document 1 and Patent Document 2, air bubbles are likely to remain in the microlenses of the optical film to be obtained. The remaining of air bubbles in the microlenses of the optical film to be obtained is remarkable particularly in a case in which the shape of the microlens is a complicated shape such as a spherical segment shape, a pyramidal shape, or a conical shape or in a case in which the contact angle of the active energy ray-curable composition with respect to the material of a roll die is great.

The remaining of air bubbles in the microlenses of the optical film means to have an interface with air in the microlenses, and the total reflection of light occurs at the interface according to the Snell's law. Hence, the remaining of air bubbles in the microlenses of the optical film becomes a factor to deteriorate the light extraction efficiency of the surface light-emitting body fabricated by providing this optical film on the light-emitting surface of a light-emitting device such as an organic EL light-emitting device.

In addition, an optical film having a desired lens shape is not obtained and deterioration in the optical characteristics to be exerted on the basis of a desired shape of the lens of the optical film is caused by the air bubbles in the microlenses of the optical film.

An object of the invention is to provide an optical film production method by which the remaining of air bubbles in the microlenses is suppressed.

In addition, an object of the invention is to provide an optical film in which the remaining of air bubbles in the microlenses is suppressed.

In addition, an object of the invention is to provide a surface light-emitting body having an excellent light extraction efficiency.

Furthermore, an object of the invention is to provide an optical film production device by which the remaining of air bubbles in the microlenses is suppressed.

Means for Solving Problem

The invention relates to an optical film production method having plural convex-shaped microlenses disposed thereon, the method including the following steps A to F.

Step A: a step of rotating a roll die having an outer circumferential surface having a plurality of concave-shaped microlens transfer portions disposed thereon and running a substrate in a rotation direction of the roll die along the outer circumferential surface of the roll die, step B: a step of supplying an active energy ray-curable composition β onto a coating roll disposed to be adjacent to the outer circumferential surface of the roll die, flattening the active energy ray-curable composition β on the coating roll by a flattening means, coating the flattened active energy ray-curable composition β on the outer circumferential surface of the roll die, step C: a step of supplying an active energy ray-curable composition α onto the substrate and coating the active energy ray-curable composition α on a surface of the substrate, step D: a step of associating the active energy ray-curable composition α coated on the surface of the substrate in the step C above and the active energy ray-curable composition β coated on the outer circumferential surface of the roll die in the step B above at an association portion between the roll die and the substrate to form a liquid pool, step E: a step of irradiating a region between the outer circumferential surface of the roll die and the surface of the substrate with an active energy ray in a state in which the active energy ray-curable composition α and the active energy ray-curable composition β associated in the step D above are sandwiched between the outer circumferential surface of the roll die and the surface of the substrate to cure the active energy ray-curable composition α and the active energy ray-curable composition β, and step F: a step of peeling off a cured product obtained in the step E above from the roll die.

In addition, the invention relates to an optical film obtained by the optical film production method.

In addition, the invention relates to a surface light-emitting device including the optical film.

Furthermore, the invention relates to an optical film production device having a plurality of convex-shaped microlenses disposed thereon, the device including:

a roll die having an outer circumferential surface having a plurality of concave-shaped microlens transfer portions disposed thereon;

a coating roll disposed to be adjacent to the outer circumferential surface of the roll die;

a first supply source for supplying an active energy ray-curable composition β onto the coating roll;

a flattening means disposed on the coating roll; and a second supply source for supplying an active energy ray-curable composition α onto a surface of a substrate.

Effect of the Invention

By the production method or the production device of the invention, it is possible to continuously obtain an optical film in which the remaining of air bubbles in the microlenses is suppressed, and a surface light-emitting body using the optical film thus obtained has an excellent light extraction efficiency.

BRIEF DESCRIPTION OF DRAWINGS

FIG. 1 is a schematic diagram illustrating an example of a convex-shape microlens on the optical film obtained by the production method of the invention;

FIG. 2 is a schematic diagram illustrating an example of the optical film obtained by the production method of the invention viewed from above the optical film;

FIGS. 3(a)-(f) are schematic diagrams illustrating disposition examples of the microlenses of the optical film obtained by the production method of the invention viewed from above the optical film;

FIG. 4 is a cross-sectional diagram schematically illustrating an example of the optical film production method of the invention;

FIG. 5 is a cross-sectional diagram schematically illustrating an example of the surface light-emitting body of the invention;

FIG. 6 is an image of the surface of an optical film obtained in Example 2 taken using an optical microscope;

FIG. 7 is an image of the surface of an optical film obtained in Example 4 taken using an optical microscope; and FIG. 8 is an image of the surface of an optical film obtained in Comparative Example 1 taken using an optical microscope.

MODE(S) FOR CARRYING OUT THE INVENTION

Hereinafter, embodiments of the invention will be described with reference to the accompanying drawings, but the invention is not limited to these drawings and embodiments.

In the optical film obtained by the production method of the invention, a plurality of convex-shaped microlenses are disposed.

(Convex Shape of Microlens)

An example of a convex-shaped microlens is illustrated in FIG. 1. In FIG. 1, (a) is a schematic cross-sectional diagram and (b) is a schematic perspective diagram. In FIG. 1, the reference numeral, 11, denotes the bottom surface portion of a microlens 10.

In the present specification, the bottom surface portion 11 of the microlens 10 refers to a virtual planar portion surrounded by the outer circumferential edge of the bottom of the microlens 10. In a case in which the optical film has a base layer (relaxation layer or stress relaxation layer) to be described later, the bottom surface portion of the microlens 10 corresponds to the interface between the microlens 10 and the base layer.

In addition, in the present specification, the longest diameter, L, of the bottom surface portion 11 of the microlens 10 refers to the length of the longest part of the bottom surface portion 11 of the microlens 10, and the average longest diameter, $L_{ave}$, of the bottom surface portion 11 of the microlens 10 is a value obtained by taking an image of the surface having the microlens 10 of the optical film using a scanning microscope, measuring the longest diameter, L, of the bottom surface portion 11 of the microlens 10 at five positions, and averaging the values measured.

In addition, in the present specification, the height, H, of the microlens 10 refers to the height from the bottom surface portion 11 of the microlens 10 to the highest part of the microlens 10, and the average height, $H_{ave}$, of the microlens 10 is a value obtained by taking an image of the cross section of the optical film using a scanning microscope, measuring the height, H, of the microlens 10 at five positions, and averaging the values measured.

Examples of the convex shape of the microlens 10 may include a spherical segment shape, a truncated spherical segment shape, an ellipsoid spherical segment shape (a shape obtained by cutting a spheroid in one plane), a truncated ellipsoid spherical segment shape (a shape obtained by cutting a spheroid in two planes parallel to each other), a pyramidal shape, a truncated pyramidal shape, a conical shape, a truncated conical shape, a roof shape related to these (a shape in which a spherical segment shape, a truncated spherical segment shape, an ellipsoid spherical segment shape, a truncated ellipsoid spherical segment shape, a pyramidal shape, a truncated pyramidal shape, a conical shape, or a truncated conical shape extends along the bottom surface portion). These shapes of the convex shape of the microlens 10 may be used singly or two or more kinds thereof may be used concurrently for the plurality of microlenses 10. Among these shapes of the convex shape of the microlens 10, a spherical segment shape, a truncated spherical segment shape, an ellipsoid spherical segment shape, and a truncated ellipsoid spherical segment shape are preferable and a spherical segment shape and an ellipsoid spherical segment shape are more preferable from the viewpoint of an excellent light extraction efficiency of the surface light-emitting body using the optical film.

The average longest diameter, $L_{ave}$, of the bottom surface portion 11 of the microlens 10 is preferably from 2 to 400 μm, more preferably from 10 to 200 μm, and even more preferably from 20 to 100 μm. The light extraction efficiency of the surface light-emitting body using the optical film is excellent when the average longest diameter, $L_{ave}$, of the bottom surface portion 11 of the microlens 10 is 2 μm or more. In addition, the microlenses are not visible and thus the optical film has an excellent appearance when the average longest diameter, $L_{ave}$, of the bottom surface portion 11 of the microlens 10 is 400 μm or less.

The average height, $H_{ave}$, of the microlens 10 is preferably from 1 to 200 μm, more preferably from 5 to 100 μm, and even more preferably from 10 to 50 μm. The light extraction efficiency of the surface light-emitting body using the optical film is excellent when the average height, $H_{ave}$, of the microlens 10 is 1 μm or more. In addition, the flexibility of the optical film is excellent when the average height, $H_{ave}$, of the microlens 10 is 200 μm or less.

The aspect ratio of the microlens 10 is preferably from 0.3 to 1.4, more preferably from 0.35 to 1.3, and even more preferably from 0.4 to 1.0. The light extraction efficiency of the surface light-emitting body using the optical film is excellent when the aspect ratio of the microlens 10 is 0.3 or more. In addition, it is easy to form the microlens transfer portion on the roll die and thus the production of the optical film is facilitated when the aspect ratio of the microlens 10 is 1.4 or less.

Incidentally, the aspect ratio of the microlens 10 is calculated from the "average height, $H_{ave}$, of microlens 10/average longest diameter, $L_{ave}$, of bottom surface portion 11 of microlens 10.

(Bottom Surface Portion of Microlens)

Examples of the shape of the bottom surface portion 11 of the microlens 10 may include a circular shape and an elliptical shape. These shapes of the bottom surface portion 11 of the convex-shaped microlens 10 may be used singly or two or more kinds thereof may be used concurrently for a plurality of the microlenses. Among these shapes of the bottom surface portion 11 of the microlens 10, a circular shape and an elliptical shape are preferable and a circular shape is more preferable from the viewpoint of an excellent light extraction efficiency of the surface light-emitting body using the optical film.

An example of an optical film 20 viewed from above (namely, the side of the surface having the microlens 10) is illustrated in FIG. 2.

The proportion of the sum of the areas of the bottom surface portions 11 of the microlenses 10 (the area surrounded by the dotted line in FIG. 2) to the area of the optical film 20 (the area surrounded by the solid line in FIG. 2) is preferably from 20 to 99%, more preferably from 30 to 95%, and even more preferably from 50 to 93%. The light extraction efficiency of the surface light-emitting body using the optical film is excellent when the proportion of the sum of the areas of the bottom surface portions 11 of the microlenses 10 with respect to the area of the optical film 20 is 20% or more. In addition, it is easy to form the transfer portion on the roll die and thus the production of the optical film is facilitated when the proportion of the sum of the areas of the bottom surface portions 11 of the microlenses 10 with respect to the area of the optical film 20 is 99% or less.

Incidentally, in a case in which all the bottom surface portions 11 of the microlenses 10 are circular shapes having the same size, the maximum value of the proportion of the sum of the areas of the bottom surface portions 11 of the microlenses 10 to the area of the optical film 20 is about 91%.

(Arrangement of Microlens)

The arrangement examples of the microlenses 10 are illustrated in FIG. 3.

Examples of the arrangement of the microlenses 10 may include a hexagonal arrangement (FIG. 3(*a*)), a rectangular arrangement (FIG. 3(*b*)), a rhombic arrangement (FIG. 3(*c*)), a linear arrangement (FIG. 3(*d*)), a circular arrangement (FIG. 3(*e*)), and a random disposition (FIG. 3(*f*)). Among these arrangements of the microlenses 10, a hexagonal arrangement, a rectangular arrangement, and a rhombic arrangement are preferable and a hexagonal arrangement and a rectangular arrangement are more preferable from the viewpoint of an excellent light extraction efficiency of the surface light-emitting body using the optical film.

The production method of the invention includes the following steps A to F.

Step A: a step of rotating a roll die having an outer circumferential surface having a plurality of concave-shaped microlens transfer portions disposed thereon running a substrate in a rotation direction of the roll die along the outer circumferential surface of the roll die, step B: a step of supplying an active energy ray-curable composition β onto a coating roll disposed to be adjacent to the outer circumferential surface of the roll die, flattening the active energy ray-curable composition β on the coating roll by a flattening means, coating the flattened active energy ray-curable composition β on the outer circumferential surface of the roll die, step C: a step of supplying an active energy ray-curable composition α onto the substrate and coating the active energy ray-curable composition α on a surface of the substrate, step D: a step of associating the active energy ray-curable composition α coated on the surface of the substrate in the step C above and the active energy ray-curable composition β coated on the outer circumferential surface of the roll die in the step B above at an association portion between the roll die and the substrate to form a liquid pool;

step E: a step of irradiating a region between the outer circumferential surface of the roll die and the surface of the substrate with an active energy ray in a state in which the active energy ray-curable composition α and the active energy ray-curable composition β associated in the step D above are sandwiched between the outer circumferential surface of the roll die and the surface of the substrate to cure the active energy ray-curable composition α and the active energy ray-curable composition β, and step F: a step of peeling off a cured product obtained in the step E above from the roll die.

The production method including steps A to F can be realized, for example, by using a production device illustrated in FIG. 4. Incidentally, the rotating and running directions of a roll die 51, a substrate 22, or the like in FIG. 4 are the direction indicated by the arrow in FIG. 4.

Hereinafter, the optical film production method of the invention using the production device illustrated in FIG. 4 will be described, but the optical film production method of the invention is not limited to the method using a device 50 for producing an optical film illustrated in FIG. 4.

(Step A)

Step A is a step to drive and rotate the roll die 51 having an outer circumferential surface on which a plurality of concave-shaped microlens transfer portions are disposed and to run the substrate 22 in the rotation direction of the roll die 51 along the outer circumferential surface of the roll die 51. Upon running this substrate, the substrate 22 is pressed to the surface of the roll die 51 by rotatable nip rolls 55 and 56 that are disposed to be adjacent to the outer circumferential surface of the roll die 51 and parallel to the roll die. In other words, the substrate 22 runs to be wound around the nip roll 55, then wound around the roll die 51, and then wound around the nip roll 56 in this order.

Examples of the roll die 51 may include a die fabricated from a metal such as aluminum, brass, or steel; a die fabricated from a resin such as a silicone resin, a urethane resin, an epoxy resin, an ABS resin, a fluorocarbon resin, or a polymethylpentene resin; a die obtained by plating a resin;

and a die fabricated from a material obtained by mixing various kinds of metal powders with a resin. Among these roll dies 51, a metal die is preferable since it exhibits excellent heat resistance and mechanical strength and is suitable for continuous production. Specifically, a metal die is preferable in many respects that it exhibits high durability to polymerization heat generation, hardly deforms, is hardly scratched, can have a temperature controlled, and is suitable for precision molding.

The roll die 51 has a transfer portion with a concave shape corresponding to a convex shape in order to transfer and form the convex-shaped microlens 10 of the optical film.

Examples of the method for producing the transfer portion may include cutting by a diamond byte and etching as described in WO 2008/069324 A. Among these methods for producing the transfer portion, etching as described in WO 2008/069324 A is preferable from the viewpoint of excellent productivity of the roll die 51 in the case of forming a concave shape having a curved surface such as a spherical segment shape, and cutting by a diamond byte is preferable from the viewpoint of excellent productivity of the roll die 51 in the case of forming a concave shape which does not have a curved surface such as a pyramidal shape.

In addition, as the method for producing the transfer portion, it is possible to use a method to produce a cylindrical roll die by fabricating a metal thin film from a master die having a convex shape obtained by inverting the concave shape of the transfer portion using an electroforming method and winding this metal thin film onto a roll core member.

The rotational speed of the roll die 51, namely, the running speed of the outer circumferential surface of the roll die is preferably from 0.1 to 50 m/min, more preferably from 0.3 to 40 m/min, and even more preferably from 0.5 to 30 m/min from the viewpoint of excellent moldability and productivity of the optical film.

(Step B)

Step B is a step to supply an active energy ray-curable composition β onto a rotatable coating roll 53 that is disposed to be adjacent to the outer circumferential surface of the roll die 51 and parallel to the roll die, to flatten the active energy ray-curable composition β on the coating roll 53 by a flattening means, and to coat the flattened active energy ray-curable composition β on the outer circumferential surface of the roll die 51.

Examples of the flattening means may include a doctor blade, an air blade, and an air knife. Among these flattening means, a doctor blade is preferable since the active energy ray-curable composition is more flattened. In the following description, a doctor blade is used as the flattening means.

The active energy ray-curable composition β is supplied onto the outer circumferential surface of the coating roll 53 through a nozzle 52 which functions as a first supply source, flattened on the coating roll by a doctor blade 54, and coated on the outer circumferential surface of the roll die 51.

The air bubbles enter the concave-shaped transfer portion of the roll die 51 and thus it is difficult to suppress the remaining of air bubbles in the microlenses of the optical film when using a method to directly drop and coat the active energy ray-curable composition β on the outer circumferential surface of the roll die 51. On the contrary, it is suppressed that the air bubbles enter the concave-shaped transfer portion of the roll die 51 and thus the remaining of air bubbles in the microlenses of the optical film is suppressed as the active energy ray-curable composition β is coated on the outer circumferential surface of the roll die 51 after once being flattened on the coating roll 53 by the doctor blade 54.

The nozzle 52 may be a single nozzle (one nozzle) or a plurality of nozzles, but it is preferably a single nozzle (one nozzle) since the active energy ray-curable composition β can be uniformly supplied.

Examples of the material of the coating roll 53 may include a metal such as aluminum, stainless steel, or brass; one having a rubber layer on the surface of the metal mentioned above. Among these materials of the coating roll 53, one having a rubber layer on the surface of a metal is preferable.

Examples of the material of the rubber of the rubber layer may include an ethylene propylene rubber, a butadiene rubber, a urethane rubber, a nitrile rubber, and a silicone rubber. Among these materials of the rubber of the rubber layer, an ethylene propylene rubber and a silicone rubber are preferable from the viewpoint of excellent resistance to an active energy ray.

The rubber layer on the surface of the coating roll 53 has a rubber hardness defined in JIS-K-6253 of preferably from 20 to 90 degrees, more preferably from 40 to 85 degrees, and even more preferably from 50 to 80 degrees. The remaining of air bubbles in the optical film is further suppressed when the rubber hardness of the rubber layer is 20 degrees or more. In addition, the strain applied to the substrate 22 decreases and thus the damage of the substrate 22 is suppressed when the rubber hardness of the rubber layer is 90 degrees or less.

It is preferable that the coating roll 53 is pressed toward the roll die 51 since the active energy ray-curable composition β can be uniformly coated. The value of the pressing pressure is preferably from 5 to 200 N and more preferably from 10 to 100 N.

Examples of the material of the doctor blade 54 may include a resin such as a polyethylene resin, a polypropylene resin, or a polyester resin; a metal such as aluminum or stainless steel. Among these materials of the doctor blade 54, a resin is preferable and a polyester resin is preferable among them since it exhibits excellent flexibility and it is suppressed that the coating roll 53 is scratched.

The shape of the doctor blade 54 is not particularly limited and a doctor blade 54 having a known shape may be used.

The opening width that is the distance between the coating roll 53 and the doctor blade 54 is preferably from 0.01 to 0.4 mm and more preferably from 0.02 to 0.3 mm. It is possible to suppress the active energy ray-curable composition β extends too much in the width direction of the roll die 51 to overflow when the opening width between the coating roll 53 and the doctor blade 54 is 0.01 mm or more. In addition, the active energy ray-curable composition β sufficiently extends in the width direction of the roll die 51 and thus the remaining of air bubbles in the microlens of the optical film can be further suppressed when the opening width between the coating roll 53 and the doctor blade 54 is 0.04 mm or less.

(Step C)

Step C is a step to supply an active energy ray-curable composition α onto the substrate 22 and to coat the active energy ray-curable composition α on the surface of the substrate 22.

Examples of the material of the substrate 22 is not particularly limited as long as the material transmits an active energy ray, and examples thereof may include an acrylic resin; a polycarbonate resin; a polyester resin such as polyethylene terephthalate, polybutylene terephthalate, and polyethylene naphthalate; a styrene resin such as polystyrene or an ABS resin; a vinyl chloride resin; a cellulose resin such as diacetyl cellulose or triacetyl cellulose; an imide resin such as polyimide or polyamide-imide; glass; and a metal. Among these materials of the substrate 22, an acrylic resin, a polycarbonate resin, a polyester resin, a styrene resin, a cellulose resin, and an imide resin are preferable and an acrylic resin, a polycarbonate resin, a polyester resin, and an imide resin are more preferable from the viewpoint of excellent flexibility and excellent active energy ray transmitting property.

The thickness of the substrate 22 is preferably from 10 to 500 µm, more preferably from 20 to 400 µm, and even more preferably from 50 to 300 µm. The handling property of the optical film is excellent when the thickness of the substrate 22 is 10 µm or more. In addition, the curability of the active energy ray-curable composition is excellent and the light extraction efficiency of the surface light-emitting body using the optical film is far superior in the case of constituting the optical film including the substrate 22 when the thickness of the substrate 22 is 500 µm or less.

The running speed of the substrate 22 is preferably from 0.1 to 50 m/min, more preferably from 0.3 to 40 m/min, and even more preferably from 0.5 to 30 m/min from the viewpoint of excellent moldability and productivity of the optical film.

It is preferable that the rotational speed of the roll die 51 and the running speed of the substrate 22 are the same speed as each other from the viewpoint of excellent moldability of the optical film.

The active energy ray-curable composition α is supplied through the nozzle 52' and coated on the surface of the substrate 22. At that time, it is preferable that the active energy ray-curable composition α is supplied onto the rotatable coating roll 53' that is disposed to be adjacent to the outer circumferential surface of the nip roll 55 and parallel to the nip roll by interposing the substrate 22 through the nozzle 52', flattened on the coating roll by a doctor blade 54', and then coated on the surface of the substrate 22 or the active energy ray-curable composition α is supplied onto the substrate 22 through the nozzle 52', flattened by a bar coater, and then coated from the viewpoint of being able to decrease the uneven coating of the active energy ray-curable composition α and to suppress the uneven thickness of the base layer. Between the two techniques, the former technique is more preferable in which the active energy ray-curable composition α is supplied onto the coating roll 53 through the nozzle 52', flattened on the coating roll by the doctor blade 54', and then coated on the surface of the substrate 22. Incidentally, the nozzle 52' functions as the second supply source in the latter technique, and the nozzle 52', the coating roll 53', and the doctor blade 54' function as the second supply source in the former technique.

For the coating roll 53', it is possible to use the same materials as those of the coating roll 53 described above.

It is preferable that the coating roll 53' is pressed toward the nip roll 55 since the active energy ray-curable composition α can be uniformly coated.

For the doctor blade 54', it is possible to use the same materials and shapes as those of the doctor blade 54 described above.

The opening width that is the distance between the coating roll 53' and the doctor blade 54' is preferably from 0.01 to 0.4 mm and more preferably from 0.02 to 0.3 mm. It is possible to suppress the active energy ray-curable composition α extends too much in the width direction of the substrate 22 to overflow when the opening width between the coating roll 53' and the doctor blade 54' is 0.01 mm or more. In addition, the active energy ray-curable composition α sufficiently extends in the width direction of the substrate 22 and thus the remaining of air bubbles in the microlens of the optical film can be further suppressed when the opening width between the coating roll 53' and the doctor blade 54' is 0.04 mm or less.

(Step D)

Step D is a step to associate the active energy ray-curable composition α coated on the surface of the substrate 22 in step C and the active energy ray-curable composition β coated on the outer circumferential surface of the roll die 51 in step B at the association portion between the roll die 51 and the substrate 22 to form a liquid pool.

The active energy ray-curable composition α and the active energy ray-curable composition β may have the same composition or different compositions, and the compositions thereof may be appropriately selected depending on the application or function of the optical film.

The optical film 20 in which the microlens 10 and the base layer 21 (see FIG. 5 to be described later) have the same composition is obtained in a case in which the compositions of the active energy ray-curable composition α and the active energy ray-curable composition β are the same as each other. On the other hand, The optical film in which the cured product of the active energy ray-curable composition β is unevenly distributed around the vicinity of the microlens 10 and the cured product of the active energy ray-curable composition α is unevenly distributed around the vicinity of the base layer 21 is obtained in a case in which the compositions of the active energy ray-curable composition α and the active energy ray-curable composition β are different from each other.

The active energy ray-curable composition α and the active energy ray-curable composition β are not particularly limited as long as they are curable by an active energy ray, but an active energy ray-curable composition containing a polymerizable monomer (A), a cross-linkable monomer (B), and an active energy ray polymerization initiator (C) is preferable from the viewpoint of excellent handling property and curability of the active energy ray-curable composition and excellent physical properties such as flexibility, heat resistance, scratch resistance, solvent resistance, and light transmitting property of the optical film.

Examples of the polymerizable monomer (A) may include a (meth)acrylate such as methyl (meth)acrylate, ethyl (meth)acrylate, n-propyl(meth)acrylate, iso-propyl(meth)acrylate, n-butyl (meth)acrylate, iso-butyl (meth)acrylate, sec-butyl (meth)acrylate, tert-butyl (meth)acrylate, n-hexyl(meth)acrylate, cyclohexyl(meth)acrylate, n-octyl(meth)acrylate, 2-ethylhexyl(meth)acrylate, isononyl(meth)acrylate, dodecyl(meth)acrylate, tridecyl(meth)acrylate, stearyl(meth)acrylate, alkyl(meth)acrylate, phenyl(meth)acrylate, benzyl (meth)acrylate, phenoxyethyl(meth)acrylate, isobornyl (meth)acrylate, glycidyl(meth)acrylate, tetrahydrofurfuryl (meth)acrylate, norbornyl(meth)acrylate, adamantyl(meth)acrylate, dicyclopentenyl(meth)acrylate, dicyclopentanyl (meth)acrylate, tetracyclododecanyl(meth)acrylate, cyclohexanedimethanol mono(meth)acrylate, 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, 2-methoxyethyl(meth)acrylate, 2-ethoxyethyl(meth)acrylate, 3-methoxybutyl(meth)acrylate, butoxyethyl(meth)acrylate, methoxy triethylene glycol(meth)acrylate, methoxy dipropylene glycol(meth)acrylate, 2-(meth)acryloyloxymethyl-2-methylbicycloheptane, 4-(meth)acryloyloxymethyl-2-methyl-2-ethyl-1,3-dioxolane, 4-(meth)acryloyloxymethyl-2-methyl-2-isobutyl-1,3-dioxolane, trimethylolpropane formal (meth)acrylate, ethylene oxide-modified phosphoric acid (meth)acrylate, or caprolactone-modified phosphoric acid (meth)acrylate; (meth)acrylic acid; (meth)acrylonitrile; a (meth)acrylamide such as (meth)acrylamide, N-dimethyl(meth)acrylamide, N-diethyl(meth)acrylamide, N-butyl (meth)acrylamide, dimethylaminopropyl(meth)acrylamide, N-methylol(meth)acrylamide, N-methoxymethyl(meth)acrylamide, N-butoxymethyl (meth)acrylamide, (meth)acryloylmorpholine, hydroxyethyl (meth)acrylamide, or methylenebis(meth)acrylamide; an epoxy (meth)acrylate such as a compound obtained by reacting (meth)acrylic acid or any derivative thereof with a bisphenol type epoxy resin obtained by the condensation reaction between a bisphenol (bisphenol A, bisphenol F, bisphenol S, tetrabromobisphenol A, or the like) and epichlorohydrin; an aromatic vinyl compound such as styrene and α-methylstyrene; a vinyl ether such as vinyl methyl ether, vinyl ethyl ether, 2-hydroxyethyl vinyl ether; a carboxylic acid vinyl ester such as vinyl acetate or vinyl butyrate; and an olefin such as ethylene, propylene, butene, or isobutene. These polymerizable monomers (A) may be used singly or two or more kinds thereof may be used concurrently. Among these polymerizable monomers (A), a (meth)acrylate, an epoxy (meth)acrylate, an aromatic vinyl compound, and an olefin are preferable and a (meth)acrylate and an epoxy (meth)acrylate are more preferable from the viewpoint of excellent handling property and curability of the active energy ray-curable composition and excellent physical properties such as flexibility, heat resistance, scratch resistance, solvent resistance, and light transmitting property of the optical film.

In the present specification, the term "(meth)acrylate" refers to an acrylate or a methacrylate.

The content of the polymerizable monomer (A) in the active energy ray-curable composition is preferably from 0.5 to 60% by mass, more preferably from 1 to 57% by mass, and even more preferably from 2 to 55% by in the total mass of the active energy ray-curable composition. The handling property of the active energy ray-curable composition is excellent and the adhesive property of the optical film to the substrate is superior when the content of the polymerizable monomer (A) is 0.5% by mass or more. In addition, the crosslinkability and curability of the active energy ray-curable composition are excellent and the solvent resistance of the optical film is excellent when the content of the polymerizable monomer (A) is 60% by mass or less.

Examples of the cross-linkable monomer (B) may include a hexa(meth)acrylate such as dipentaerythritol hexa(meth)acrylate or caprolactone-modified dipentaerythritol hexa(meth)acrylate; a penta(meth)acrylate such as dipentaerythritol hydroxy penta(meth)acrylate or caprolactone-modified dipentaerythritol hydroxy penta(meth)acrylate; a tetra(meth)acrylate such as ditrimethylolpropane tetra(meth)acrylate, pentaerythritol tetra(meth)acrylate, pentaerythritol ethoxy-modified tetra(meth)acrylate, dipentaerythritol hexa(meth)acrylate, dipentaerythritol penta(meth)acrylate, or tetramethylolmethane tetra(meth)acrylate; a tri(meth)acrylate such as trimethylolpropane tri(meth)acrylate, tris ethoxylated trimethylolpropane tri(meth)acrylate, pentaerythritol tri(meth)acrylate, ethoxylated pentaerythritol tri(meth)acrylate, tris(2-(meth)acryloyloxyethyl) isocyanurate, trimethylolpropane tri(meth)acrylate modified by an aliphatic hydrocarbon having from 2 to 5 carbon atoms, or isocyanuric acid ethylene oxide-modified tri(meth)acrylate; a di(meth)acrylate such as triethylene glycol di(meth)acrylate, diethylene glycol di(meth)acrylate, 1,3-butylene glycol di(meth)acrylate, 1,4-butanediol di(meth)acrylate, 1,5-pentanediol di(meth)acrylate, 1,6-hexanediol di(meth)acrylate, nonanediol di(meth)acrylate, neopentyl glycol di(meth)acrylate, methylpentanediol di(meth)acrylate, diethylpentanediol di(meth)acrylate, hydroxypivalic acid neopentyl glycol di(meth)acrylate, tetraethylene glycol di(meth)acrylate, tripropylene glycol di(meth)acrylate, polybutylene glycol di(meth)acrylate, tricyclodecanedimethanol di(meth)acrylate, 2,2-bis(4-(meth)acryloxypolyethoxyphenyl) propane, 2,2-bis(4-(meth)acryloxyethoxyphenyl)propane, 2,2-bis(4-(3-(meth)acryloxy-2-hydroxypropoxy)phenyl) propane, 1,2-bis(3-(meth)acryloxy-2-hydroxypropoxy)ethane, 1,4-bis(3-(meth)acryloxy-2-hydroxypropoxy)butane, bis(2-(meth)acryloyloxyethyl)-2-hydroxyethyl isocyanurate, cyclohexane dimethanol di(meth)acrylate, dimethylol tricyclodecane di(meth)acrylate, hydroxypivalic acid neopentyl glycol di(meth)acrylate, polyethoxylated cyclohexanedimethanol di(meth)acrylate, polypropoxylated cyclohexanedimethanol di(meth)acrylate, polyethoxylated bisphenol A di(meth)acrylate, polypropoxylated bisphenol A di(meth)acrylate, hydrogenated bisphenol A di(meth)acrylate, polyethoxylated hydrogenated bisphenol A di(meth)acrylate, polypropoxylated hydrogenated bisphenol A di(meth)acrylate, bis-phenoxyfluoreneethanol di(meth)acrylate, neopentyl glycol-modified trimethylolpropane di(meth)acrylate, di(meth)acrylate of ε-caprolactone adduct of hydroxypivalic acid neopentyl glycol, di(meth)acrylate of γ-butyrolactone adduct of hydroxypivalic acid neopentyl glycol, di(meth)acrylate of caprolactone adduct of neopentyl glycol, di(meth)acrylate of caprolactone adduct of butylene glycol, di(meth)acrylate of caprolactone adduct of cyclohexanedimethanol, di(meth)acrylate of caprolactone adduct of dicyclopentanediol, di(meth)acrylate of ethylene oxide adduct of bisphenol A, di(meth)acrylate of propylene oxide adduct of bisphenol A, di(meth)acrylate of caprolactone adduct of bisphenol A, di(meth)acrylate of caprolactone adduct of hydrogenated bisphenol A, di(meth)acrylate of caprolactone adduct of bisphenol F, or isocyanuric acid ethylene oxide-modified di(meth)acrylate; a diallyl compound such as diallyl phthalate, diallyl terephthalate, diallyl isophthalate, or diethylene glycol diallyl carbonate; allyl (meth)acrylate; divinylbenzene; methylenebisacrylamide; a polyester di(meth)acrylate such as a compound obtained by the reaction of a polyhydric alcohol (ethylene glycol, hexanediol, polyethylene glycol, or polytetramethylene glycol) and (meth)acrylic acid or any derivative thereof with a polybasic acid (phthalic acid, succinic acid, hexahydrophthalic acid, tetrahydrophthalic acid, terephthalic acid, azelaic acid, or adipic acid); a urethane polyfunctional (meth)acrylate such as a compound obtained by reacting a diisocyanate compound (tolylene diisocyanate, isophorone diisocyanate, xylene diisocyanate, dicyclohexylmethane diisocyanate, or hexamethylene diisocyanate) with a hydroxyl group-containing (meth)acrylate (a polyfunctional (meth)acrylate such as 2-hydroxyethyl(meth)acrylate, 2-hydroxypropyl(meth)acrylate, 4-hydroxybutyl(meth)acrylate, or pentaerythritol tri(meth)acrylate) or a compound obtained by adding a diisocyanate compound to the hydroxyl group of an alcohol (one kind or two or more kinds of an alkane diol, a polyether diol, a polyester diol, and a spiroglycol compound) and reacting the remaining isocyanate group with a hydroxyl group-containing (meth)acrylate; a divinyl ether such as diethylene glycol divinyl ether or triethylene glycol divinyl ether; and a diene such as butadiene, isoprene, or dimethyl butadiene. These cross-linkable monomers (B) may be used singly or two or more kinds thereof may be used concurrently. Among these cross-linkable monomers (B), a hexa(meth)acrylate, a penta(meth)acrylate, a tetra (meth)acrylate, a tri(meth)acrylate, a di(meth)acrylate, a diallyl compound, an allyl (meth)acrylate, a polyester di(meth)acrylate, and a urethane polyfunctional (meth)acrylate are preferable and a hexa(meth)acrylate, a penta(meth)acrylate, a tetra(meth)acrylate, a tri(meth)acrylate, a di(meth)acrylate, a polyester di(meth)acrylate, and a urethane polyfunctional (meth)acrylate are more preferable from the viewpoint of excellent physical properties such as flexibility, heat resistance, scratch resistance, solvent resistance, and light transmitting property of the optical film.

The content of the cross-linkable monomer (B) in the active energy ray-curable composition is preferably from 30 to 98% by mass, more preferably from 35 to 97% by mass, and even more preferably from 40 to 96% by mass in the total mass of the active energy ray-curable composition. The crosslinkability and curability of the active energy ray-curable composition are excellent and the solvent resistance of the optical film is excellent when the content of the cross-linkable monomer (B) is 30% by mass or more. In addition, the flexibility of the optical film is excellent when the content of the cross-linkable monomer (B) is 98% by mass or less.

Examples of the active energy ray polymerization initiator (C) may include a carbonyl compound such as benzoin, benzoin methyl ether, benzoin ethyl ether, benzoin isopropyl ether, benzoin isobutyl ether, acetoin, benzil, benzophenone, p-methoxybenzophenone, 2,2-diethoxyacetophenone, and α,α-dimethoxy-α-phenylacetophenone, benzyl dimethyl ketal, methylphenyl glyoxylate, ethylphenyl glyoxylate, 4,4'-bis(dimethylamino)benzophenone, 1-hydroxycyclohexyl phenyl ketone, 2-hydroxy-2-methyl-1-phenylpropan-1-one, or 2-ethylanthraquinone; a sulfur compound such as tetramethylthiuram monosulfide or tetramethylthiuram disulfide; and an acylphosphine oxide such as 2,4,6-trimethylbenzoyldiphenylphosphine oxide or benzoyldiethoxyphosphine oxide. These active energy ray polymerization initiators (C) may be used singly or two or more kinds thereof may be used concurrently. Among these active energy ray polymerization initiators (C), a carbonyl compound and an acylphosphine oxide are preferable and a carbonyl compound is more preferable from the viewpoint of excellent handling property and curability of the active energy ray-curable composition and excellent light transmitting property of the optical film.

The content of the active energy ray polymerization initiator (C) in the active energy ray-curable composition is preferably from 0.1 to 10% by mass, more preferably from 0.5 to 8% by mass, and even more preferably from 1 to 5% by mass in the total mass of the active energy ray-curable composition. The handling property and curability of the active energy ray-curable composition are excellent when the content of the active energy ray polymerization initiator (C) is 0.1% by mass or more. In addition, the light transmitting property of the optical film is excellent when the content of the active energy ray polymerization initiator (C) is 10% by mass or less.

The active energy ray-curable composition α and the active energy ray-curable composition β may contain fine particles in order to scatter light if necessary.

The fine particles are not particularly limited as long as they are fine particles having a light diffusing effect in the visible light wavelength region (approximately from 400 to 700 nm), and known fine particles can be used. The fine particles may be used singly or two or more kinds thereof may be used concurrently.

Examples of the material of the fine particles may include a metal such as gold, silver, silicon, aluminum, magnesium, zirconium, titanium, zinc, germanium, indium, tin, antimony, or cerium; a metal oxide such as silicon oxide, aluminum oxide, magnesium oxide, zirconium, titanium oxide, zinc oxide, germanium oxide, indium oxide, tin oxide, indium tin oxide, antimony oxide, or cerium oxide; a metal hydroxide such as aluminum hydroxide; a metal carbonate such as magnesium carbonate; a metal nitride such as silicon nitride; and a resin such as an acrylic resin, a styrene resin, a silicone resin, a urethane resin, a melamine resin, or an epoxy resin. These materials of the fine particles may be used singly or two or more kinds thereof may be used concurrently. Among these materials of the fine particles, silicon, aluminum, magnesium, silicon oxide, aluminum oxide, magnesium oxide, aluminum hydroxide, magnesium carbonate, an acrylic resin, a styrene resin, a silicone resin, a urethane resin, a melamine resin, and an epoxy resin are preferable and silicon oxide, aluminum oxide, aluminum hydroxide, magnesium carbonate, an acrylic resin, a styrene resin, a silicone resin, a urethane resin, a melamine resin, and an epoxy resin are more preferable from the viewpoint of excellent handling property at the time of producing the optical film.

The volume average particle size of the fine particles is preferably from 0.5 to 20 μm, more preferably from 0.7 to 15 μm, and even more preferably from 0.8 to 10 μm. It is possible to effectively scatter the light in the visible wavelength region when the volume average particle size of the fine particles is 0.5 μm or more. In addition, the fine particles exhibit excellent fluidity at the time of being mixed with the active energy ray-curable composition when the volume average particle size thereof is 20 μm or less.

Examples of the shape of the fine particles may include a spherical shape, a columnar shape, a cubic shape, a cuboid shape, a pyramidal shape, a conical shape, a star shape, a donut shape, a daisy-chain shape, a powder shape, and an irregular shape. These shapes of the fine particles may be used singly or two or more kinds thereof may be used concurrently. Among these shapes of the fine particles, a spherical shape, a cubic shape, a cuboid shape, a pyramidal shape, and a star shape are preferable and a spherical shape is more preferable from the viewpoint of being able to effectively scatter the light in the visible wavelength region.

The content of the fine particles in the active energy ray-curable composition α and the active energy ray-curable composition β is preferably from 1 to 50% by mass and more preferably from 5 to 40% by mass in 100% by mass of the active energy ray-curable composition from the viewpoint of being able to effectively scatter the light in the visible wavelength region.

The active energy ray-curable composition α and the active energy ray-curable composition β may contain other components such as various kinds of additives including a defoaming agent, a mold releasing agent, an antistatic agent, a leveling agent, an antifouling property improver, a dispersion stabilizer, and a viscosity modifier if necessary.

The viscosity of the active energy ray-curable composition α and the active energy ray-curable composition β is preferably from 10 to 3000 mPa·s, more preferably from 20 to 2500 mPa·s, and even more preferably from 30 to 2000 mPa·s from the viewpoint of excellent handling property at the time of producing the optical film.

It is preferable that the nip roll 55 is pressed toward the roll die 51 at a constant pressure since the thickness of the optical film becomes uniform. The value of the pressing pressure is preferably from 5 to 200 N and more preferably from 10 to 100 N.

The active energy ray-curable composition α coated on the surface of the substrate 22 in step C and the active energy ray-curable composition β coated on the outer circumferential surface of the roll die 51 in step B meet to be associated at the association portion between the roll die 51 and the substrate 22, namely, the part at which the substrate 22 is sandwiched between the nip roll 55 and the roll die 51 to form a liquid pool. As the extent of association at this time, the mass ratio of the active energy ray-curable composition β to the active energy ray curable composition α is preferably β:α=5 to 50:50 to 95 and more preferably β:α=10 to 40:60 to 90 since the generation of air bubbles is suppressed.

It is possible to control the thickness of the base layer 21 by the opening width that is the distance between the roll die 51 and the nip roll 55 and the pressure directed from the nip roll 55 to the roll die 51.

The base layer 21 is mainly plays a role to relax the stress caused by the polymerization shrinkage or the like during curing and to maintain the convex shape of the microlens 10.

The thickness of the base layer 21 is preferably from 1 to 60 μm, more preferably from 3 to 40 μm, and even more preferably from 5 to 30 μm. The handling property of the optical film is excellent when the thickness of the base layer 21 is 1 μm or more. In addition, the light extraction efficiency of the surface light-emitting body using the optical film is superior when the thickness of the base layer 21 is 60 μm or less.

(Step E)

Step E is a step to irradiate the region between the outer circumferential surface of the roll die 51 and the surface of the substrate 22 with an active energy ray in a state in which the active energy ray-curable composition α and the active energy ray-curable composition β associated in step D are sandwiched between the outer circumferential surface of the roll die 51 and the surface of the substrate 22 to cure the active energy ray-curable composition α and the active energy ray-curable composition β.

Examples of the active energy ray may include ultraviolet light, an electron beam, X-ray, infrared rays, and visible light. Among these active energy rays, ultraviolet light and an electron beam are preferable and ultraviolet light is more preferable from the viewpoint of excellent curability of the active energy ray-curable composition and being able to suppress deterioration of the optical film.

{Step F}

Step F is a step to peel off the cured product obtained in step E from the roll die 51.

The roll die 51 may be subjected to a release treatment or a mold releasing agent may be contained in the active energy ray-curable composition α and the active energy ray-curable composition β in order to facilitate the peeling off of the cured product from the roll die 51 in step F.

The cured product obtained as described above can be used as an optical film in which a plurality of convex-shaped microlenses are disposed and can be suitably used in various applications, particularly in constituting a surface light-emitting body. At that time, one in which the cured product and the substrate 22 are joined and integrated may be utilized as an optical film or the cured product from which the substrate 22 is peeled off may be utilized as an optical film.

The former case in which one in which the cured product and the substrate 22 are joined and integrated is utilized as an optical film has an advantage in terms of the production method that the process is simplified since the step of peeling off the substrate 22 is not included.

(Surface Light-Emitting Body)

The surface light-emitting body of the invention includes the optical film of the invention.

Examples of the surface light-emitting body of the invention may include a surface light-emitting body as illustrated in FIG. 5.

Hereinafter, the surface light-emitting body of the invention illustrated in FIG. 5 will be described, but the surface light-emitting body according to the invention is not limited to the surface light-emitting body illustrated in FIG. 5.

In the surface light-emitting body illustrated in FIG. 5, the optical film 20 is provided on the surface of a glass substrate 41 of an EL light-emitting device 40 fabricated by sequentially stacking the glass substrate 41, an anode 42, a light-emitting layer 43, and a cathode 44 via a pressure sensitive adhesive layer 30. The optical film 20 consists of a stacked body of the microlens 10 composed of the active energy ray-curable composition, the base layer 21, and the substrate 22.

The surface light-emitting body fabricated by providing the optical film 20 of the invention to the EL light-emitting device 40 has an excellent light extraction efficiency.

EXAMPLES

Hereinafter, the invention will be specifically described with reference to Examples, but the invention is not limited to these Examples.

Incidentally, the "parts" and "%" in Examples indicate the "parts by mass" and "% by mass", respectively.

(Evaluation of Presence or Absence of Air Bubbles Remaining in Microlens)

The surface having the microlenses of the optical films obtained in Examples and Comparative Examples was observed using an optical microscope (model name "VHX-900" manufactured by KEYENCE CORPORATION) and evaluation was performed according to the following criteria.

A: remaining of air bubbles is not entirely recognized
B: remaining of air bubbles is partly recognized
C: remaining of air bubbles is entirely recognized (Measurement of Light Extraction Efficiency of Surface Light-Emitting Body)

A light shielding sheet which had a hole with a diameter of 10 mm and a thickness of 0.1 mm was disposed on the surface light-emitting bodies obtained in Examples and Comparative Examples, and this was disposed on the sample opening of an integrating sphere (manufactured by Labsphere, Inc., size: 6 inches). In this state, the light exiting through the hole with a diameter of 10 mm of the light shielding sheet when the integrating sphere was lit by applying a current of 10 mA to the organic EL light-emitting device constituting a surface light-emitting body was measured using a spectroscopic measuring instrument (spectrometer: model name "PMA-12" (manufactured by Hamamatsu Photonics K.K.), software: software name "basic software U6039-01 ver.3.3.1 for PMA"), the correction was conducted by the standard luminosity curve, and the number of photons of the surface light-emitting body was calculated.

The proportion of the number of photons of the surface light-emitting bodies obtained in Examples and Comparative Examples with respect to 100% of the number of photons of the surface-emitting body without including an optical film was adopted as the light extraction efficiency.

(Preparation of Active Energy Ray-Curable Composition)

Into a glass flask, 117.6 g (0.7 mol) of hexamethylene diisocyanate and 151.2 g (0.3 mol) of an isocyanurate type hexamethylene diisocyanate trimer, 128.7 g (0.99 mol) of 2-hydroxypropyl acrylate and 693 g (1.54 mol) of pentaerythritol triacrylate as the hydroxyl group-containing (meth)acrylate, 22.1 g of di-n-butyltin dilaurate as the catalyst, and 0.55 g of hydroquinone monomethyl ether as the polymerization inhibitor were introduced, and the temperature thereof was raised to 75° C., and the mixture was continuously stirred while maintaining at 75° C. to react until the concentration of residual isocyanate compound in the flask reached 0.1 mol/L or less and then cooled to room temperature, thereby obtaining a urethane polyfunctional acrylate.

The active energy ray-curable resin composition was obtained by mixing 34.6 parts of the urethane polyfunctional acrylate thus obtained, 24.7 parts of polybutylene glycol dimethacrylate (trade name "ACRYESTER PBOM" manufactured by Mitsubishi Rayon Co., Ltd.), 39.5 parts of ethylene oxide-modified bisphenol A dimethacrylate (trade name "NEW FRONTIER BPEM-10" manufactured by DKS Co., Ltd.), and 1.2 parts of 1-hydroxycyclohexyl phenyl ketone (trade name "Irgacure 184" manufactured by BASF) together.

The active energy ray-curable resin composition thus obtained was used as the active energy ray-curable composition α and the active energy ray-curable composition β.

(Production of Roll Die)

The outer circumferential surface of a steel roll having an outer diameter of 200 mm and a length in the axial direction of 320 mm was plated with copper to form a plated layer having a thickness of 200 μm and the Vickers hardness of 230 Hv. A photosensitive agent was coated on the surface of the copper plated layer, and the resultant was exposed to a laser beam, developed, and etched, thereby obtaining a die having a transfer portion in which a hemispherical concave shape having a diameter of 50 μm and a depth of 25 μm were lined on the copper plated layer in a hexagonal arrangement at a minimum interval of 3 μm formed. The surface of the die thus obtained was plated with chromium in order to impart corrosion resistance and durability, thereby obtaining a roll die.

Incidentally, the width of the region in which the concave-shaped transfer portion is present in the roll die was 280 mm, this region was disposed in the center of the length in the axial direction of the roll die of 320 mm, and both ends in the axial direction of the roll die were set as a mirror region.

(Production of Optical Film)

An optical film was produced using the active energy ray-curable composition described above and the roll die described above by carrying out steps A to F using the production device illustrated in FIG. 4.

Incidentally, a polyester film (trade name "DIAFOIL T910E125" manufactured by Mitsubishi Plastics, Inc., width: 340 mm, thickness: 125 μm) was used as the substrate 22, a rubber roller (trade name "GRANPAUL UV" manufactured by MIYAKAWA ROLLER Co., Ltd., rubber hardness of surface: 60 degrees) was used as the coating rolls 53 and 53' and nip rolls 55 and 56, a plastic doctor blade (trade name "Maniberu" manufactured by ECHO BLADE, thickness: 0.35 mm, cutting edge shape: taper) was used as the doctor blades 54 and 54', an ultraviolet light irradiating apparatus (model name "Light Hammer 6" manufactured by Heraeus K.K. Noblelight Division) was used as the active energy ray irradiating apparatus 57.

The running speed of the substrate 22 was set to 3 m/min, the running speed of the outer circumferential surface of the roll die 51 was set to 3 m/min, the surface temperature of the roll die 51 was set to 60° C., the temperature of the active energy ray-curable composition α and the active energy ray the curable composition β was set to 60° C., the viscosity of the active energy ray-curable composition α and the active energy ray-curable composition β was set to 300 mPa·s, and ultraviolet light having an integrated light quantity of 0.9 J/cm$^2$ was irradiated from the active energy ray irradiating apparatus 57.

Example 1

The optical film was obtained using a method in which the active energy ray-curable composition β was supplied onto the coating roll 53 and this active energy ray-curable composition β was flattened on the coating roll 53 by the doctor blade 54 and then coated on the outer circumferential surface of the roll die 51 as the method for coating the active energy ray-curable composition β, setting the opening width between the coating roll 53 and the doctor blade 54 to 0.03 mm, and using a method in which the active energy ray-curable composition α was directly supplied onto the substrate 22 and coated without using the coating roll 53' and the doctor blade 54' as the method for coating the active energy ray-curable composition α.

Examples 2 to 4

The optical films were obtained by conducting an operation in the same manner as in Example 1 except that the opening width between the coating roll 53 and the doctor blade 54 was changed to that presented in Table 1.

Example 5

The optical film was obtained by conducting an operation in the same manner as in Example 2 except that a method in which the active energy ray-curable composition α was supplied onto the substrate 22, flattened by a bar coater, and coated was used as the method for coating the active energy ray-curable composition α.

Example 5

The optical film was obtained by conducting an operation in the same manner as in Example 2 except that a method in which the active energy ray-curable composition α was supplied onto the coating roll 53' and this active energy ray-curable composition α was flattened on the coating roll 53' by the doctor blade 54' and then coated on the substrate 22 was used as the method for coating the active energy ray-curable composition α and the opening width between the coating roll 53' and the doctor blade 54' was set to 0.1 mm.

Comparative Example 1

The optical film was obtained by conducting an operation in the same manner as in Example 2 except that a method in which the active energy ray-curable composition β was directly dropped and coated on the outer circumferential surface of the roll die 51 without using the coating roll 53 and the doctor blade 54 was used as the method for coating the active energy ray-curable composition β.

The evaluation results of the presence or absence of air bubbles remaining in the microlens of the optical films obtained in Examples 1 to 6 and Comparative Example 1 above are presented in Table 1. In addition, the images of the surface, namely, the surface on which the microlenses are formed of the optical films obtained in Example 2, Example 4, and Comparative Example 1 taken using an optical microscope are illustrated in FIGS. 6 to 8, respectively.

TABLE 1

|  | Coating of active energy ray-curable composition b | | Coating of active energy ray-curable composition a | | Evaluation of presence or absence of remaining air bubble |
| --- | --- | --- | --- | --- | --- |
|  | Flattening means | Opening width (mm) | Flattening means | Opening width (mm) | |
| Example 1 | Doctor blade + Coating roll | 0.03 | — | — | A |
| Example 2 | Doctor blade + Coating roll | 0.1 | — | — | A |
| Example 3 | Doctor blade + Coating roll | 0.5 | — | — | B |
| Example 4 | Doctor blade + Coating roll | 1.5 | — | — | B |
| Example 5 | Doctor blade + Coating roll | 0.1 | Bar coater | — | A |
| Example 6 | Doctor blade + Coating roll | 0.1 | Doctor blade + Coating roll | 0.1 | A |
| Comparative Example 1 | — | — | — | — | C |

In the optical film obtained in Comparative Example 1, the remaining of air bubbles was recognized in the entire microlenses, but in the optical films obtained in Examples 1 to 6, the remaining of air bubbles was recognized in part of the microlenses at most, and particularly in the optical films obtained in Examples 1 and 2 and Examples 5 and 6, the remaining of air bubbles was not recognized in the entire microlenses.

Example 7

A pressure sensitive adhesive layer (refractive liquid having a refractive index of 1.52, manufactured by Cargill, Inc.) was coated on the light-exiting surface side of an organic EL light-emitting device (one prepared by peeling off the optical film on the surface of the light-exiting surface (light-emitting surface) side of a white OLED device "Symfos OLED-010K" manufactured by Konica Minolta, Inc.) and the surface of the substrate of the optical film obtained in Example 2 was allowed to optically adhere thereto, thereby obtaining a surface light-emitting body.

Comparative Example 2

The surface light-emitting body was obtained by conducting an operation in the same manner as in Example 7 except that the optical film obtained in Example 2 was changed to the optical film obtained in Comparative Example 1.

The light extraction efficiency of the surface light-emitting bodies thus obtained are presented in Table 2.

TABLE 2

|  | Light extraction efficiency (%) |
| --- | --- |
| Example 7 | 176 |
| Comparative Example 2 | 171 |

It has been confirmed that the surface light-emitting body obtained in Example 7 has a superior light extraction efficiency than the surface light-emitting body obtained in Comparative Example 2.

In the optical film obtained by the production method of the invention, the remaining of air bubbles in the microlenses is suppressed, and thus the use of this optical film makes it possible to obtain a surface light-emitting body having an excellent light extraction efficiency. This surface light-emitting body can be suitably used, for example, in lighting, a display, and a screen.

EXPLANATIONS OF LETTERS OR NUMERALS

10 Microlens
11 Bottom surface portion
20 Optical film
21 Base layer
22 Substrate
30 Pressure sensitive adhesive layer
40 Organic EL light-emitting device
41 Glass substrate
42 Anode
43 Light-emitting layer
44 Cathode
50 Device for producing optical film
51 Roll die
52 Nozzle
52' Nozzle
53 Coating roll
53' Coating roll
54 Doctor blade
54' Doctor blade
55 Nip roll
56 Nip roll and
57 Active energy ray irradiating apparatus

The invention claimed is:
1. An optical film production method having a plurality of convex-shaped microlenses disposed thereon, the method comprising the following steps A to F:
   step A: rotating a roll die having an outer circumferential surface having a plurality of concave-shaped microlens transfer portions disposed thereon and running a substrate in a rotation direction of the roll die along the outer circumferential surface of the roll die;
   step B: supplying an active energy ray-curable composition β onto a first coating roll disposed to be adjacent to the outer circumferential surface of the roll die, flattening the active energy ray-curable composition β on the first coating roll by a flattener, and coating the flattened active energy ray-curable composition β on the outer circumferential surface of the roll die by the first coating roll so as to fill the plurality of concave-shaped microlens transfer portions with the active energy ray-curable composition β;

step C: supplying an active energy ray-curable composition α onto a second coating roll disposed to be adjacent to the surface of the substrate and coating the active energy ray-curable composition α on a surface of the substrate by the second coating roll;

step D: associating the active energy ray-curable composition α coated on the surface of the substrate in the step C and the active energy ray-curable composition β coated on the outer circumferential surface of the roll die in the step B at an association portion between the roll die and the substrate to form a liquid pool;

step E: irradiating a region between the outer circumferential surface of the roll die and the surface of the substrate with an active energy ray in a state in which the active energy ray-curable composition α and the active energy ray-curable composition β associated in the step D are sandwiched between the outer circumferential surface of the roll die and the surface of the substrate to cure the active energy ray-curable composition α and the active energy ray-curable composition β; and step F: peeling off a cured product obtained in the step E from the roll die, wherein the flattener is any one of a doctor blade, an air blade, and an air knife.

2. The optical film production method according to claim 1, wherein the roll die is pressed at a pressure of from 5 to 200 N by the first coating roll in the step B.

3. The optical film production method according to claim 2, wherein an opening width between the first coating roll and the flattener is maintained in a range of from 0.01 to 0.4 mm in the step B.

4. The optical film production method according to claim 2, wherein the active energy ray-curable composition α is flattened after the active energy ray-curable composition α is supplied in the step C.

5. The optical film production method according to claim 2, wherein a convex shape of the microlens is at least one kind of a spherical segment shape, a truncated spherical segment shape, an ellipsoid spherical segment shape, a truncated ellipsoid spherical segment shape, a pyramidal shape, a truncated pyramidal shape, a conical shape, or a truncated conical shape.

6. The optical film production method according to claim 2, wherein a viscosity of the active energy ray-curable composition β is from 10 to 3000 mPa·s.

7. The optical film production method according to claim 2, wherein a viscosity of the active energy ray-curable composition α is from 10 to 3000 mPa·s.

8. The optical film production method according to claim 1, wherein an opening width between the first coating roll and the flattener is maintained in a range of from 0.01 to 0.4 mm in the step B.

9. The optical film production method according to claim 1, wherein the active energy ray-curable composition α is flattened after the active energy ray-curable composition α is supplied in the step C.

10. The optical film production method according to claim 1, wherein a convex shape of the microlens is at least one kind of a spherical segment shape, a truncated spherical segment shape, an ellipsoid spherical segment shape, a truncated ellipsoid spherical segment shape, a pyramidal shape, a truncated pyramidal shape, a conical shape, or a truncated conical shape.

11. The optical film production method according to claim 1, wherein a viscosity of the active energy ray-curable composition β is from 10 to 3000 mPa·s.

12. The optical film production method according to claim 1, wherein a viscosity of the active energy ray-curable composition α is from 10 to 3000 mPa·s.

13. The optical film production method according to claim 1, further comprising flattening the active energy ray-curable composition α on the second coating roll by any one of a doctor blade, an air blade, and an air knife, in the step C.

* * * * *